United States Patent

[11] 3,575,503

[72] Inventors John A. Van Auken
 Miami Beach;
 Lionel B. Hoffman, Fort Lauderdale; M.
 Gene Kaufman, South Miami, Fla.
[21] Appl. No. 725,390
[22] Filed Apr. 30, 1968
[45] Patented Apr. 20, 1971
[73] Assignee Copystatics Manufacturing Corp.
 Miami Lakes, Fla.

[54] COPYING MACHINE
 39 Claims, 6 Drawing Figs.
[52] U.S. Cl. ..................................................... 355/8
[51] Int. Cl. .................................................. G03g 15/00
[50] Field of Search ...................................... 355/13 (X), 11, 8

[56] References Cited
 UNITED STATES PATENTS
 3,181,420 5/1965 Rautbord ..................... 355/13X
 3,445,160 5/1969 Helland ........................ 355/11

Primary Examiner—Samuel S. Matthews
Assistant Examiner—Russell E. Adams, Jr.
Attorney—Amster and Rothstein ABSTRACT: An electrostatic copying machine capable of very fast operation in a reciprocating multiple copy mode. The original document to be copied is transported through the machine past the scanning window. After a first copy has been made the document itself is shuttled back past the scanning window until the leading edge of the original is at the front end of the scanning window. At this time another forward movement and scan take place, and another copy is made. This process is repeated for as many times as the number of copies required. The overall operation is fast for two reasons. First, the reverse feed rate of the original is greater than the forward feed rate since during reverse feed there is no scanning. Second, the copy paper feed begins during the reverse travel of the original such that by the time the leading edge of the original reaches the front end of the scanning window, the leading edge of the copy paper reaches the front end of the exposure window and exposure can proceed without lost time. During forward feed the original is moved only until the trailing edge clears the scanning window. During reverse feed the original is moved only until the leading edge clears the scanning window. The use of a cam which can be clutched to the original drive system permits the copy feed to start at a time such that perfect registration is assured when the original forward feed begins, independent of the length of the original.

INVENTORS
JOHN A. VAN AUKEN
LIONEL HOFFMAN
BY M. GENE KAUFMAN
Amster & Rothstein
ATTORNEYS

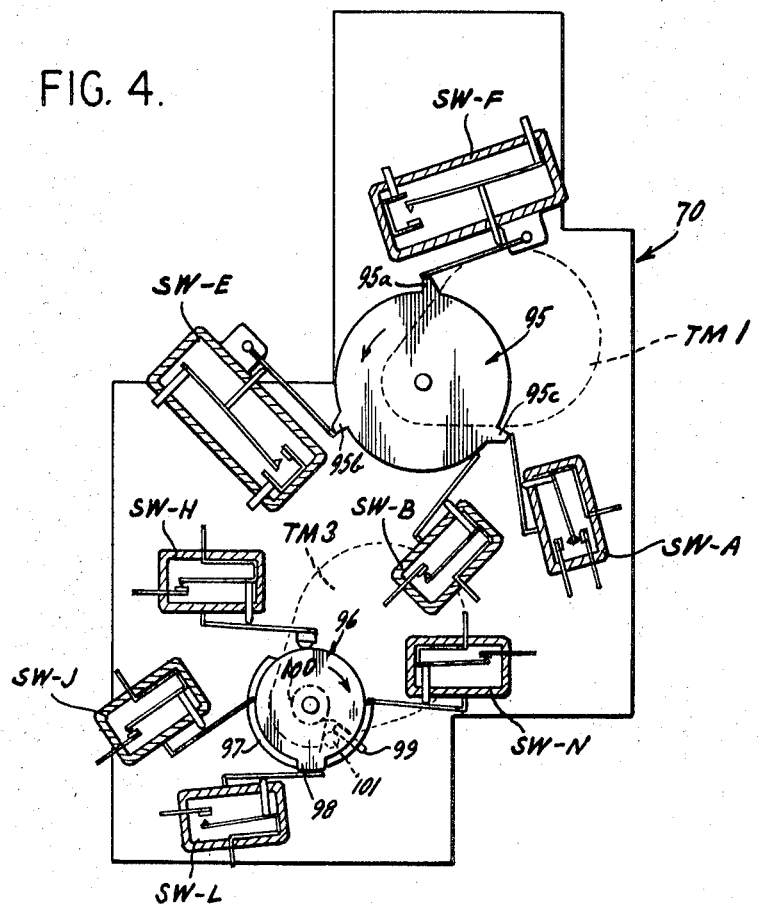
FIG. 4.
FIG. 5.
FIG. 6.
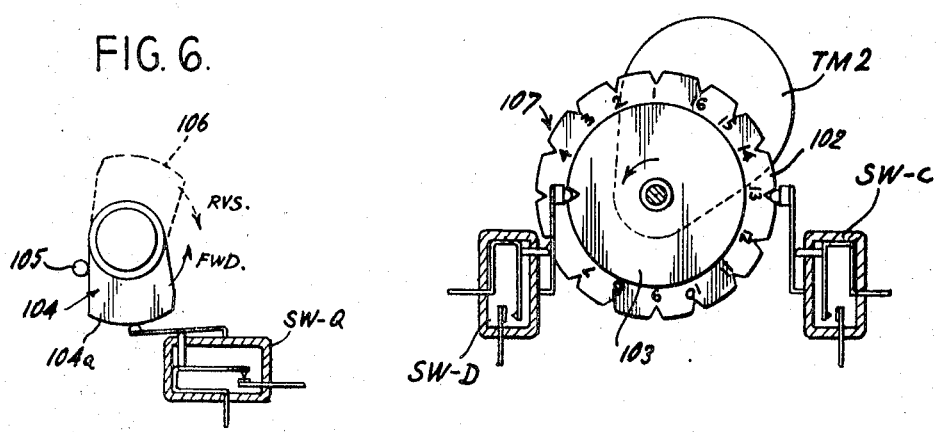

COPYING MACHINE

This invention relates to copying machines, and more particularly to an improved multiple copy mode of operation for an electrostatic copying machine.

There are two types of arrangements for controlling the scanning of an original document to be copied by an electrostatic copying machine. In the first type, the document is held stationary and an optional system is moved across it for the purpose of scanning it section by section. This type of arrangement has the obvious disadvantage of the need to provide the necessary mounting for the movable optical system. In the second type, the original document is moved past a stationary optical system, section by section of the document being scanned as it moves past the optical system. Various difficulties have also been encountered in the design of machines of this type.

Two approaches have been taken in the design of movable document machines. In one, the original document, book, etc. is placed on a plate, the plate being moved past the stationary optical system during the scanning. In order to make multiple copies of an original document, the plate is shuttled back and forth past the optical system, the optical system scanning the original document each time a forward pass is made. One of the disadvantages of the shuttling-plate technique is that each time a new document is to be copied the previous original must be removed from the plate and the new original must be placed on it. This can be very time consuming especially if only a single copy is required of each of many originals.

The second approach which has been taken in movable document machines is to provide for the feeding in of an original document to be copied. The operator need merely feed in one document after another without removing each original from the machine after a copy is made of it. Instead, all of the original documents are fed through the machine into a collecting tray. The problem with this technique relates to multiple copying. Once the operator has fed in a document to be copied, it is out of his control. Yet the document must be moved past the stationary optical system a number of times in succession. This has been achieved by transporting the document in a closed loop, the optical system being placed along one section of the loop. The original document traverses the loop once for each copy required. After the requisite number of copies have been made, the original document is directed out of the loop to the collecting tray.

However, this circulating type system is also disadvantageous in a number of respects. The loop must be long enough to accommodate the longest original document to be copied. If in a particular case a short document is being copied, a considerable amount of time is wasted as the short document traverses a lengthy loop. Also, in such a closed loop it is very important that all of the feed rollers be in perfect parallelism. If they are not, there will be a tendency for the original to be displaced sidewise relative to the path direction with an attendant loss of registration, and possibly jamming of the original. Finally, not only is it possible for the original document to be bent as it traverses the loop, there is a limit to the thickness of the original which can be passed through the machine. For example, cardboard posters are generally incapable of being passed through such a machine for the purpose of copying a particular page.

It is the general object of this invention to speed up the operation of a copying machine in the multiple copy mode, and to overcome the aforesaid problems.

Briefly, in accordance with the principles of our invention, the original document itself is shuttled back and forth past a stationary optical system. During each forward pass of the original, the document is scanned and another copy is made. After the last copy is made the document is discharged from the machine into a collecting tray and another document to be copied can be inserted. Because this reciprocating original feed does not impart any bend to the original as it passes through the machine, the original comes out of the machine in substantially the same condition as it went into it. The machine can operate on a thicker original because the original is maintained in a substantially planer position during both forward and reverse feeds. Finally, it is not as crucial that all of the roller pairs in the planar path be in perfect parallelism. Since the document retraces its original path there is substantially no cumulative error, and furthermore most minor errors which are introduced during the forward feed are compensated for as the document goes back through the same rollers.

In any duplicating machine of the types described, the time required to make each copy when a number of copies are being made is to a great extent dependent upon the time required to return the optical system to its initial position (in the case where the original remains stationary), or to return the original to its starting position (in the case where the optical system remains stationary). In the closed-loop system the "return" time is that time required for the original to go all around the loop from the end of the original scanning window back to the beginning of the window. In the system of our invention, the return time is the time required to move the original in the reverse direction back past the scanning window. In the illustrative embodiment of our invention, multiple copying is speeded up by providing for a return feed rate which is greater than the forward feed rate of the original.

The illustrative embodiment of the invention is a machine of the type in which the copy paper is contained on a roll. Sheets of copy paper are cut off from the roll dependent upon the length of each original to be copied. In a typical machine of this type, a sensor is disposed in the path of the original in front of the scanning window for detecting the leading and trailing edges of the original. When the sensor first detects the leading edge of the original, copy paper is drawn from the copy paper roll to supply copy paper to the copy exposure window. When the sensor detects the trailing edge of the original, a knife is operated to cut the copy paper which had been previously fed from the roll. At the same time, the copy paper feed stops. In order to insure that the forward edge of the copy paper reaches the copy exposure window at the same time that the forward edge of the original reaches the scanning window, it has been the practice to place the sensor at a distance in front of the scanning window equal to the distance of the knife in front of the exposure window. In our invention, as described above, it would appear that to make multiple copies it is necessary to move the original all the way back such that the forward edge of the original is adjacent the sensor. At this time the forward feed could begin together with the copy roll feed. (References in this description and the claims to forward edges of the scanning and exposure windows refer to those points in the travel paths where exposure of the copy paper actually begins. In the illustrative embodiment of the invention exposure begins when the original and copy paper reach the physical edges of the respective windows. In other cases, where the windows are enlarged, it is the point in each travel path where exposure actually begins and copy synchronization is achieved that must be taken into account and should be considered as the "forward edge" of the respective window).

In the illustrative embodiment of our invention, however, in order to speed up multiple copying, the original is not moved all the way back until its forward edge is adjacent the sensor. To this end a timing cam is provided which can be driven from the drive chain which operates the feed rollers for the original. The cam is clutched to be driven from the drive chain during its travel past the scanning window. When the trailing edge of the original has passed the scanning window, the chain drive is reversed so that the original is fed in the reverse direction through the machine. During the reverse movement of the original, the timing cam moves in its reverse direction. The timing cam controls the start of the copy roll feed while the original is still being returned past the scanning window. The leading edge of the original is returned only to the forward edge of the scanning window, at which time it changes direction and starts moving in the forward direction. By this time the leading edge of the copy paper has reached the exposure window so that perfect registration of the original and copy paper is assured. In this way, the multiple copy mode is further speeded up because it is not necessary to return the leading edge of the original all the way back to the sensor which controls the copy roll feed during the single copy mode. During multiple copying, the sensor controls only the cutting of the copy paper (when the trailing edge of the original is detected); the start of the copy roll feed is controlled by the timing cam, not the sensor.

It is a feature of our invention to shuttle an original document back and forth past a scanning window when making multiple copies.

It is a further feature of our invention to return the original document past the scanning window at a rate faster than the forward feed rate of the document.

It is a further feature of our invention to provide a timing cam which can be clutched to the original forward and reverse feed mechanism for representing the position of the leading edge of the original.

It is a still further feature of our invention to start the copy roll feed during reverse movement of the original in accordance with the return of the timing cam.

Further objects, features and advantages of the invention will become apparent upon consideration of the following detailed description in conjunction with the drawing, in which:

FIGS. 4, 5 and 6 depict the arrangement of various cams and switches used in the system of FIGS. 1—3.

GENERAL DESCRIPTION OF MACHINE OPERATION

Figure 1:
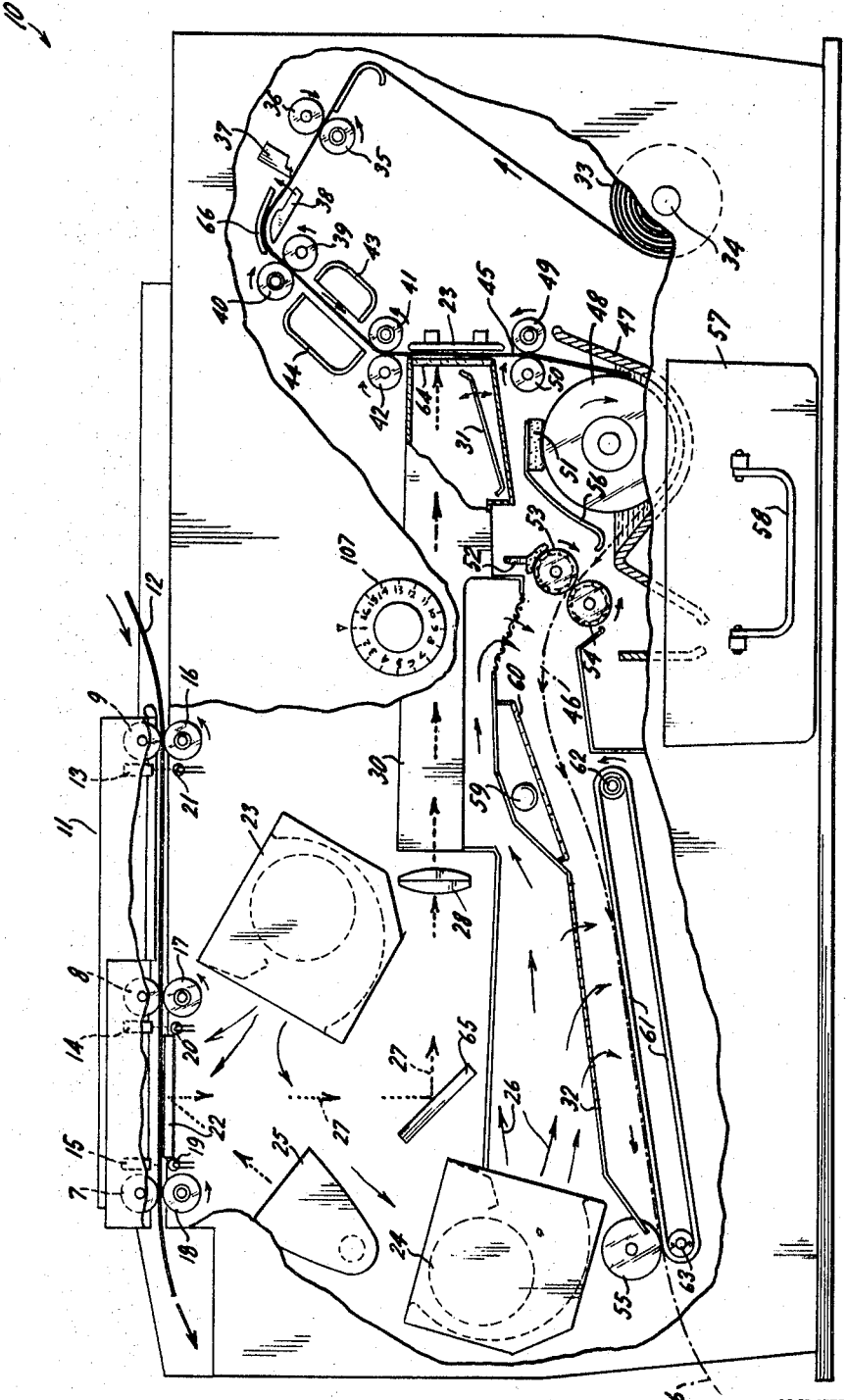
FIG. 1 depicts schematically (partially broken away) the arrangement of various mechanisms in a copying machine 10 employing the principles of our invention.

The copy paper used in the illustrative embodiment of the invention is electrophotographic in nature. It has the ability to retain an electric charge placed on its photoconductive coating by an electrostatic field. The coating can be discharged by the application of light. Typically, copy paper roll 33 (FIG. 1) consists of a base paper with photoconductive zinc oxide particles dispersed in a resin coating. An electrical charge is placed on the front and back surfaces of the zinc oxide coating. When light strikes the zinc oxide particles they become conductive and the charged surfaces are neutralized.

As the leading edge of copy paper roll 33 passes through rollers 35, 36, 39, 40 and 41, 42, the paper passes through the corona shields 43, 44 which house two sets of very fine wire elements (not shown) across which is placed a high DC voltage supply. The negative wire elements are contained within shield 44 while the positive wire elements are contained within shield 43. The shields aid in establishing the corona field.

As the copy paper passes through the two sets of oppositely charged wire elements, a uniform negative charge is applied to the photoconductive coating on the surface facing shield 44. A uniform positive charge is placed on the surface of the coating facing shield 43. The charges placed on the surfaces of the copy paper will be retained for a reasonable length of time provided it is not exposed to any light. When light strikes the photoconductive coating, the zinc oxide particles which are exposed become conductive, neutralizing the negative and positive charges in the exposed areas.

As the copy paper passes the exposure window consisting of a glassless window strung with monofilament 64 and pressure member 23, the photoconductive coating is exposed in accordance with dark and light areas on the original to be copied. Rotary knife 38 cuts a copy sheet from the roll such that the cut sheet is the same length as the original to be copied. When knife 38 operates, the copy roll paper feed stops, although the cut copy sheet continues to move past the exposure window to trough 47 in the developing section of the machine.

The original document 12 is fed into the machine between rollers 9, 16 which turn to move the original in the direction shown (from the right end of the machine in FIG. 1 to the left end). As the original passes the scanning window, on top of glass plate 22, light from two exposure lamps (shown in phantom in FIG. 1) within reflector 25 is reflected from the light image areas on the original along the dotted arrows 27 as shown. The light passes through lens system 28, assembly 30 and window 64 to expose the copy paper. The copy paper feed is controlled such that the leading edge of the copy sheet just reaches the exposure window when the leading edge of the original reaches the scanning window. The copy paper retains a negative charge in those areas corresponding to dark (image) areas on the original. The nonimage areas on the original reflect a great deal of light to the surface of the copy paper causing the neutralization of the charged areas corresponding to the nonimage areas on the original.

The copy sheet is then fed to trough 47. As shown in the drawing, the forward end of the copy paper has just entered the trough. The copy sheet continues to travel along path 46 until the copy sheet is ejected from the machine. In trough 47 there is a developer solution consisting of charged toner particles which are attracted to the negatively charged image areas on the copy paper. The attracted toner particles are impregnated and fixed to the copy paper coating by a system of squeegee rollers and forced hot air drying.

The machine includes two basic systems of feed rollers or paper transport rollers, shown in FIG. 2 and to be discussed below. One system is kept constantly rotating by a series of sprockets and drive chains, while the second system is clutch-controlled so that it operates only when one of two clutches is engaged.

When original document 12 is inserted between pickup rollers 9, 16 the original is transported to the left in FIG. 1. As the leading edge of the original emerges from rollers 9, 16, it actuates photocell switch 13. Each of photocell switches 13, 14, 15 is provided with a respective light source 21, 20, 19. When the leading edge of the original passes between a light source and its respective photocell switch, the change in state is registered and used to control the machine operation. When switch 13 first operates, copy paper roller clutch K–6 (FIGS. 2 and 3) is energized to control copy paper insert rollers 35, 36 to rotate. These rollers pull the forward edge of the copy roll to direct the copy paper through the corona unit. The other rollers along the copy paper path continuously operate. Initially, the forward edge of the copy paper is adjacent to knives 37, 38. Thus, although the rollers following the knives along the copy paper path rotate continuously there is no copy sheet to be transported through the machine. But once rollers 35, 36 start operating, copy paper is drawn from the roll into the copy paper transport system. The corona unit within shields 43, 44 charges the surfaces of the copy paper. The original and the copy paper are synchronized in their movements. The distance along the copy paper path from the two knives to the forward end of the exposure window equal the distance from photocell switch 13 to the forward end of the scanning window. Since the rollers along the original and copy paths move the original and the copy paper at the same speed, and since the copy paper starts to move past the knives under control of rollers 35, 36 just when the forward edge of the original is adjacent photocell switch 13, it is seen that the leading edges of the original and copy paper arrive at the scanning and exposure windows respectively at the same time. This insures that the image formed on the copy will be in the same relative position as the image on the original.

As the trailing edge of the original passes photocell switch 13, the copy paper roller clutch K–6 is disengaged. Rollers 35, 36 stop turning and copy roll 33 remains stationary. At the same time knife solenoid K-10 (FIG. 3) is energized to cause rotary knife 38 to cut the copy paper to the exact length of the original. The cut sheet continues to be transported by the copy paper transport system through developer trough 47. Intensifier drum 48 is constantly turned in the direction shown. (It is possible to turn it in the opposite direction, and at various speeds as well). This insures that the copy paper is guided through the developing trough. The developer solution itself is contained in tank 57 which can be pulled out of the machine by handle 58. A pumping system (not shown) pumps the developer upward into trough 47.

The copy sheet then passes under deflector 56 toward the nip of squeegee rollers 53, 54. The squeegee rollers remove the excess liquid dispersant from the copy paper and to some slight degree also imbed the attracted toner particles into the zinc oxide coated surface of the copy paper. Wiper 52 wipes metal squeegee rollers 53 to prevent "tracking back" or offsetting of a previous image, just as wiper 51 wipes intensifier drum 48. The copy sheet is then forced down by the circulating air under drier lamp 59 onto belt 61 which moves continuously around rollers 62, 63, roller 62 being turned by the constantly rotating chain drive. The copy sheet is finally passed between belt 61 and plastic idler rollers 55, several of which may be included on the same shaft. These rollers slightly crease the copy paper so that it will stack properly in the copy receiving tray (not shown).

Blowers 23, 24 force air (shown by arrows 26) through the machine as is well known in the art, for example, to dissipate the heat generated by the exposure lamps. A series of guides 32 are provided for properly directing the air.

Shutter 31 can be moved up and down from outside the machine (not shown) to adjust the time interval during which each section of the copy paper is exposed. The lower the right end of the shutter, the larger the opening and the greater the exposure. The units shown symbolically on FIG. 1 are generally of types well known in the art and for the purposes of the present invention need not be gone into in any greater detail. A machine constructed in accordance with the principles of our invention includes many mechanisms, controls and indicators, not shown in the drawing. For example, various indicator lights may be provided to notify the operator when additional developer solution is required or when a new roll of copy paper must be placed in the machine. The only control shown in the drawing is that required for an understanding of the present invention, namely, the multiple copy selector dial 107 shown in FIGS. 1 and 5. This dial is marked in equal graduations numerically representing the number of copies desired. The selector dial can be reset at any time during machine operation providing for maximum flexibility. If the selector dial is allowed to remain in the normal position (single copy mode) shown in FIG. 5, the machine will produce only one copy for each original inserted into it. Any other position will provide the number of copies as indicated by the selector dial setting.

In the multiple copy mode, during the first cycle the original is scanned in the usual manner. Before it has travelled far enough to be released by the last set of rollers 7, 18, the trailing edge of the original actuates photocell switch 15. This causes the original transport roller system to reverse and return the original, at a speed greater than the forward speed, to the right toward the normal insertion point. When the leading edge of the original clears photocell 14, the original transport roller system is again normalized and transports the original to the left past the scanning window where it is scanned a second time (All references herein to leading and trailing edges of the original are made respectively to the left edge of the original and the right edge of the original in FIG. 1. Thus, even when the original is being transported in the reverse direction, the leading edge is still considered to be the leftmost edge in FIG. 1.) This procedure is repeated until the multiple copy selector dial 107 is "counted down" to the normal single copy mode position. The dial is decremented one position during each reverse travel of the original. When all copies have been made except the last, the selector dial is fully decremented to the single copy mode position, at which time the machine will produce one more copy and deposit the original in the original receiving tray.

To speed up the multiple copy operation, the original is returned only so far as to allow its leading edge to be adjacent to the forward end of the scanning window. Since the original immediately starts its forward movement, it is necessary for the leading edge of the copy sheet to be at the forward end of the exposure window by this time, i.e., the copy feed must start while the original is still being moved in the reverse direction. In the single copy mode, the copy feed starts when photocell 13 detects the leading edge of the original. But in the multiple copy mode, except during the first forward feed of the original, the leading edge of the original does not pass photocell 13. For this reason an alternate mechanism must be provided for initiating the copy feed during reverse movement of the original.

Cam 106 (FIG. 6) is clutched to the original forward feed system when the leading edge of the original passes photocell switch 15. The cam rotates counterclockwise as the original continues in the forward direction. When the original starts to move in the reverse direction, cam 106 starts restoring in the clockwise direction. The cam is fully restored when the leading edge of the original passes photocell 15 in the reverse direction. But during the clockwise movement of cam 106, some time prior to its full restoration, switch SW-Q is operated. The operation of the switch starts the copy paper feed. The leading edge of the original must yet travel back past photocell 15 (switch SW-Q operates while the leading edge of the original is still to the left of photocell 15 in FIG. 1) and the scanning window to photocell 14. The leading edge of the copy paper must travel from the knives to the forward end of the exposure window during the same time interval. The original reverse feed rate is greater than the copy feed rate. To assure proper registration of the original and copy at the scanning and exposure windows it is only necessary to have cam 106 operate switch SW-Q at a point during the reverse movement of the original where the ratio of the distance of the leading edge of the original from photocell 14 to the distance between the knives and the exposure window is equal to the ratio of the original reverse feed rate to the copy feed rate. In this way the leading edge of the original will reach photocell 14 just when the leading edge of the copy sheet reaches the exposure window.

As soon as photocell 14 detects the leading edge of the original, the original starts moving in the forward direction at the same speed as the copy paper is moving. It is still necessary to cut the copy sheet. This is easily accomplished. The positions of the original and copy paper are the same as though the machine were operating in the single copy mode. Consequently, when photocell 13 detects the trailing edge of the original, it actuates the cutting mechanism and inhibits further feed from the copy paper roll. The length of the cut copy sheet during each cycle in the multiple copy mode is thus the same as that of the original.

GENERAL DESCRIPTION OF ORIGINAL AND COPY TRANSPORT SYSTEMS

Figure 2:
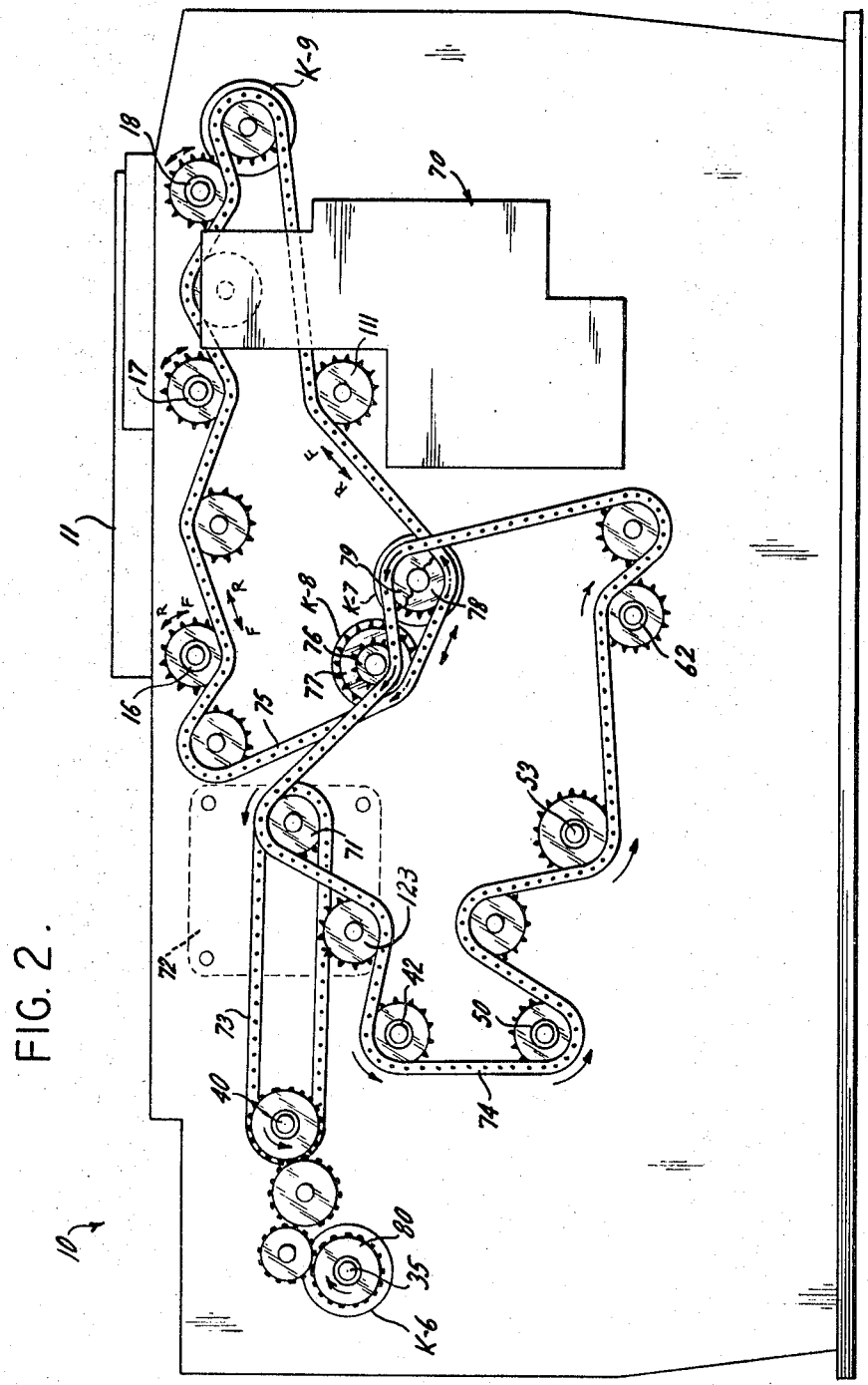
FIG. 2 is a view, with the housing removed, showing the other side of the copying machine of FIG. 1, showing the various drive chains for moving the original and copy sheets.

Referring to FIG. 2, when the main drive motor 72 is energized by the system on-off switch (not shown) it rotates main drive sprockets 71 counterclockwise. Main drive chain 74 is driven in a counterclockwise direction by sprockets 71. This chain turns various sprockets, including tension adjustment idler sprocket 123 and the sprockets coupled to rollers 42, 50, 53 and 62. These four rollers turn continuously to move the copy paper. The fifth roller which is continuously turned in the path of the copy paper is roller 40, coupled to a sprocket driven by drive chain 73. Chain 73, like chain 74, is driven by sprocket 71 as long as the main power switch is energized. Chain 74 drives sprocket 79 in the counterclockwise direction and drives sprocket 76 in the clockwise direction. Sprocket 76 rotates at a greater speed than that of sprocket 79 because of its smaller diameter.

Chain 75 is the original transport drive chain. It is driven indirectly by main drive chain 74 through an electrical clutch system. When forward clutch K–7 (to be described in connection with FIG. 3) is energized, sprockets 78 and 79 are clutched together and sprocket 78 moves with continuously rotating sprocket 79. DRive chain 75 moves in the forward (F) direction, and since the diameter of sprockets 78 and 79 are the same, chain 75 moves at the same speed as chain 74. Since the transport rollers have the same diameters, the original and copy sheets move through the machine at the same speed. Chain 75, in addition to moving over a tension adjustment idler sprocket 111, drives the three sprockets coupled to rollers 16, 17 and 18. Referring to FIG. 1, these are the three driven rollers in the original transport system.

During multiple copying the original is first transported in a forward direction to be scanned and is then returned in the reverse direction at high speed. This forward and reversing process continues as long as the machine remains in the multiple copy mode. When the original is being returned, forward clutch K–7 is deenergized and sprocket 78 is no longer coupled to sprocket 79. AT the same time reverse clutch K–8 (to be described in connection with FIG. 3) is energized, which engages reverse sprocket 77 with sprocket 76. Since sprocket 76 moves at a faster rate than sprocket 79, and sprocket 77 when clutched to sprocket 76 moves at its rate, chain 75 moves in the reverse (R) direction at a greater speed than it does in the forward direction. With chain 75 moving clockwise, rollers 16, 17 and 18 move in the reverse direction (opposite to that shown in FIG. 1) to return the leading edge of the original to the forward end of the scanning window. When this point is reached, the control circuits again change the driving direction of chain 75 by deenergizing reverse clutch K–8 and energizing forward clutch K–7.

Although chain 73 continuously drives the sprocket coupled to roller 40, as well as the three gears following it and terminating in gear 80, roller 35 does not rotate continuously. This is the roller which starts the copy paper feed. Only when clutch K–6 is operated is roller 35 coupled to gear 80. At this time copy paper feed begins.

The drive system is shown only schematically in FIG. 2, since the basic elements of such a drive system are well known. For example, it is understood that chain 74 can be used to drive any other elements which must be driven in the machine. The important thing to note in FIG. 2 is the use of three clutches in connection with sprocket pairs 78, 79 and 76, 77 and gear 80. The first clutch controls the forward movement of the original document. The second clutch controls the reverse movement of the original document at a faster speed. The third clutch controls copy paper feed.

In the original transport system, rollers 16, 9 serve as the original input rollers, rollers 17, 8 serve as the scanner input rollers, and rollers 18, 7 serve as the original exit rollers. As described above, rollers 16, 17 and 18 are driven by chain 75 in either direction. Rollers 7, 8 and 9 are contained in bridge assembly 11 and are in friction contact with their respective lower rollers when bridge 11 is placed on the machine. The bridge is removable so that in the event of an original jam, it can be corrected with little difficulty. Photocell switches 13, 14 and 15 contained in bridge 11 are connected to the rest of the machine by contacts on bridge 11. The bridge also includes a pressure plate (not shown) for bearing against the original on top of scanning glass 22. The spacing between the pressure plate and scanning glass 22 is several paper thicknesses.

An original collecting tray (not shown) is provided at the left end of the machine of FIG. 1 for collecting successive originals as they are fed through the machine. During multiple copying, the original is scanned in the forward direction in the usual manner, but before it is released by exit rollers 7, 18, all three pairs of transport rollers are automatically reversed and the original is returned at high speed in the reverse direction. The control circuit (FIG. 3) to be described below prevents a copy from being made while the original is being reversed. The original continues to be transported in the reverse direction until the leading edge is to the right of scanning window 22 at which time the control circuit again causes the original to be transported in the forward direction to be scanned again. Photocells 14 and 15 are disposed at each end of the scanning glass and serve various functions to be described below. Photocell 13 serves to control the length of the cut copy sheet as well as the copy paper feed.

Copy paper roll 33 is mounted on copy paper roll shaft 34. Although not shown, as is known in the art, provision is made for placing new copy paper rolls on the shaft as they are used up.

The operations of the original transport system during the single and multiple copy modes are considerably different. However, with respect to the copy transport system the operation is the same. Rollers 35, 36 and knife 38 control successive feedings of copy sheets into the copy transport system. The multiple copying mode operation will be described in detail below after the control circuit of FIG. 3 is first described with respect to single mode operation.

DETAILED DESCRIPTION OF SINGLE COPY OPERATION

Figure 3:
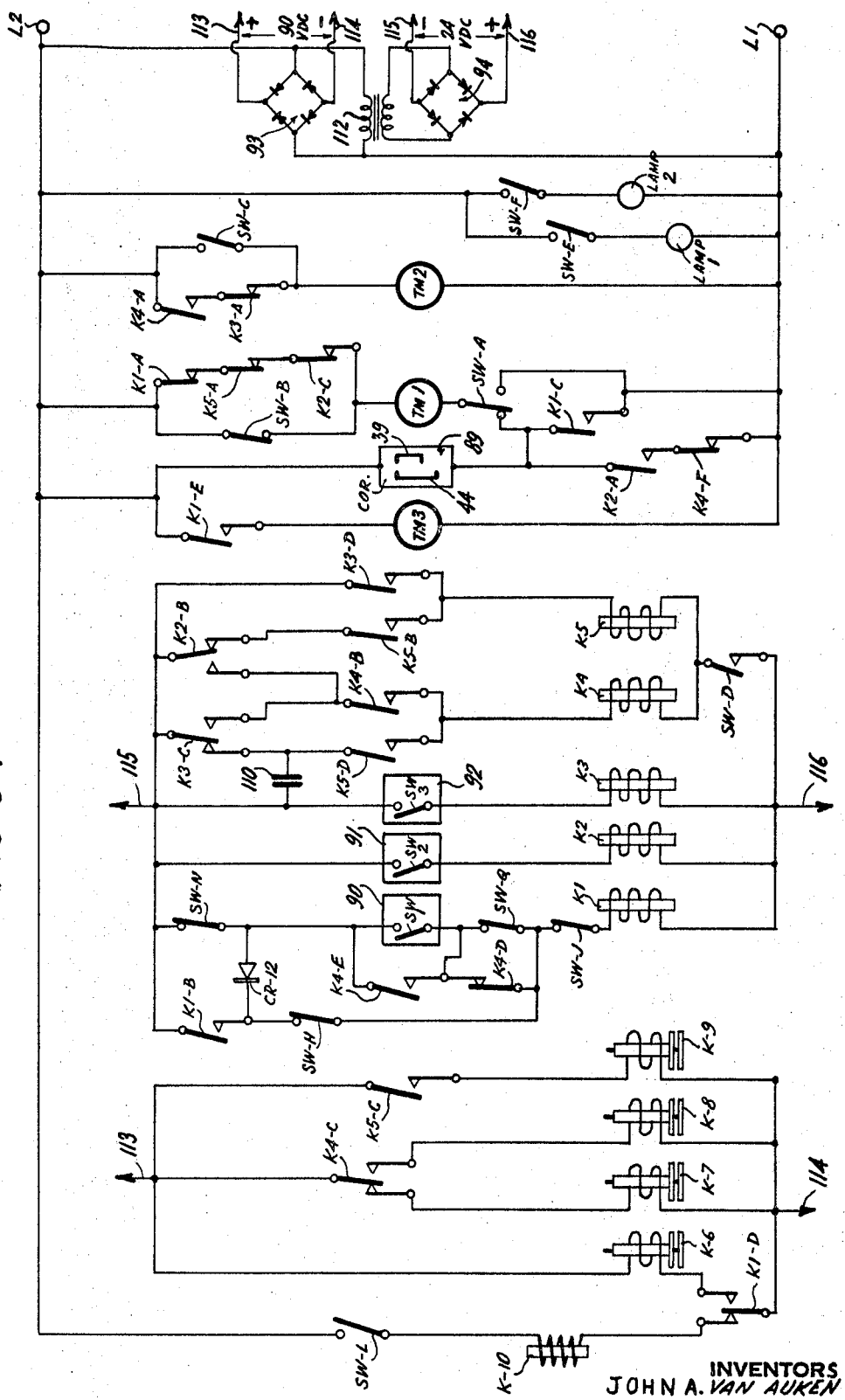
FIG. 3 is a schematic diagram illustrating a control circuit for governing the operation of the machine of FIGS. 1 and 2 in accordance with the principles of the invention.

Referring to FIG. 3, three switches, SW1, SW2 and SW3, are shown enclosed in three boxes 90, 91 and 92. These switches are symbolic of the three photocells 13, 14 and 15 and their associated amplifier circuitry in the original transport system. SW1 corresponds to photocell 13, SW2 corresponds to photocell 14 and SW3 corresponds to photocell 15. Each switch is normally open but closes when the original passes under the respective photocell and blocks light from the respective one of light sources 19, 20 and 21. The switches are shown only symbolically since the construction of such switches are well known to those skilled in the art.

Before proceeding with a description of the operation of the control circuit shown on FIGS. 3—6, it is necessary to set forth the meaning of the various notations used on the drawing. On FIG. 3 there are five relays K1 through K5. Each of these relays is normally deenergized. Each relay has a number of contacts, A, B, etc. For example, contact K3–D is the fourth movable contact on relay K3. All of the contacts are shown in FIG. 3 in their normal positions with all five relays deenergized.

On FIG. 3 there are also four clutches K–6 through K–9. Clutch K–6 is the paper roller clutch which when energized causes copy paper rollers 35 and 36 to operate. Clutch K–6 is shown on FIG. 2 as controlling rotation of roller 35. Clutch K–7 controls forward feed of the original, and when energized causes rollers 16, 17 and 18 to rotate in the directions shown in FIG. 1. Clutch K–8 is the reverse clutch which when energized controls the reverse movement of the original. As seen in FIG. 3, contact K4–C controls the energization of either clutch K–7 or clutch K–8. Finally, clutch K–9 when energized controls movement of cam 104 of FIG. 6 in synchronism with original drive chain 75 (FIG. 2). This clutch is operated only during multiple copying.

K–10 is the solenoid which when energized operates rotary knife 38 to cut the copy paper.

On FIG. 3 there are also three timing motors TM1, TM2 and TM3. When energized, these motors control movements of respective cams 95 (FIG. 4), 102 and 103 (which comprise selector dial 107–FIG. 5), and 96 (FIG. 4). These three cams, as well as cam 104 (FIG. 6), actuate various switches SW–A, SW–B, etc. Except for SW–A, each switch has two terminals. With the cams in their normal positions as shown in FIGS. 4--6, some of the switches are open and some are closed. Switch SW–J, for example, is closed, and as shown in FIG. 3 a connection is made through the two terminals of this switch to the winding of relay K1. Others of the switches such as SW–L are open. As will be described below, rotations of the various cams control the opening of the normally closed switches, and the closing of the normally open switches. Switch SW-A, unlike the others, has three contacts as shown in FIG. 4, and as similarly shown in FIG. 3 in the circuit of timing motor TM1. In the rest position as shown in FIG. 4, SW-A is deactuated with a slight rotation of cam 95, the contact connections reverse and timing motor TM1 is connected to terminal L1 in FIG. 3, bypassing contact K1-C.

As shown on the right side of FIG. 3, two rectifiers 93, 94 and a transformer 112 are provided for deriving two DC potentials, 24 volts and 90 volts, across conductors 113—116. The various clutches and relays on FIG. 3 are connected between these DC potentials, while the three timing motors are connected across the AC line terminals L1 and L2.

When the leading edge of the original actuates switch SW1, the energizing circuit for relay K1 is completed through normally closed switch SW-N, switch SW1, normally closed switch SW-Q, and normally closed switch SW-J. Closed contact K4-D bypasses switch SW-Q and part of the energizing current for relay K1 flows through this contact. With the energization of relay K1 the copy paper roller clutch K-6 is operated, current flowing through the winding of the clutch and the now closed K1-D transfer contact. The corona charging system including a high voltage rectifier (shown symbolically by numeral 89) is also energized through the now closed K1-C contact, this contact connecting the corona charging circuit to line terminal L1.

At the same time, timing motor TM1 starts operating with the closing of the K1-C contact. The motor circuit is completed from terminal L1 through the K1-C contact, switch SW-A, and normally closed switch SW-B connected to line terminal L2. Although switch SW-B is bypassed by contacts K1-A, K5-A and K2-C, current does not flow through these contacts because contact K1-A is open. The operation of motor TM1 starts the turning of cam 95 on FIG. 4. The cam turns counterclockwise and as soon as lobes 95a, 95b moves slightly, switches SW-E and SW-F close. Each of these switches is connected in the energizing circuit for one of the two exposure lamps (FIG. 3). In the illustrative embodiment of the invention two such lamps are included in reflector 25 (FIG. 1). Motor TM1 and cam 95 are provided to insure that the exposure lamps remain on for not less than 5 seconds. This is necessary since the lamps have a tendency to darken on shorter duty cycles. As will become apparent below, cam 95 turns 120° during each copying cycle. If timing motor TM1 is not interrupted, the cam turns this amount within 5 seconds. In the case of long originals, however, the timing motor is interrupted so that the lamps remain energized even longer.

As soon as lobe 95c moves slightly, switch SW-A changes position such that the energizing circuit for timing motor TM1 bypasses contact K1-C. Thus, even after relay K1 releases, the timing motor can still operate. The motor continues to run until lobe 95b opens switch SW-B. Unless relays K1 and K2 are released at this time and contacts K1-A and K2-C are closed, the energizing circuit for TM1 is broken.

With the closing of contact K1-E, timing motor TM3 starts operating. This motor insures a cut copy length of not less than 8 inches and not more than 20 inches. Provided that the length of the original is within these two limits the actual length of the cut copy will be identical with that of the original. Otherwise, a minimum length of 8 inches or a maximum of 20 inches is cut. The 8-inch minimum is to insure that the cut copy sheet has a sufficient length so as to at all times be driven by rollers in the copy transport section. Otherwise, if the cut copy is too short it may be trapped in the machine. The 20-inch maximum is to insure that the copy sheet will not jam in the machine.

Cam 96 has two separate camming surfaces 97 and 98. Switches SW-H and SW-N are controlled by the lower camming surface 97. Switches SW-J and SW-L are controlled by the upper camming surface 98. The lower camming surface 97 extends more than halfway around cam 96, while camming surface 98 extends only a fraction of the way around. With the energization of timing motor TM3 by the closing of contact K1-E, cam 96 starts to turn and switch SW-N opens. Although the original energizing current for relay K1 flowed through this contact, the relay remains energized because contact K1-B is now closed and current flows through it and contact SW-H. Even after switch SW-N opens, diode CR-12 remains nonconducting because it is shorted by the low resistance path through switch SW-H. However, with the opening of switch SW-H, current flows through closed contact K1-B and the diode, and through switch SW1, the parallel circuit including switch SW-Q and contact K4-D, and switch SW-J.

The purpose of this circuit is to insure the minimum copy length of 8 inches. By the time camming surface 97 turns sufficiently to open switch SW-H, at least 8 inches of copy paper have been fed into the copy transport system. Relay K1 cannot release before this minimum feed has occurred, and since knife solenoid K-10 cannot operate until relay K1 releases, the minimum length cut copy sheet is 8 inches. Only after switch SW-H opens does diode CR-12 conduct, and only then does the opening of switch SW1 control the knife operation.

As soon as cam 96 starts to rotate, camming surface 98 allows switch SW-L to close. Although this switch is in the energizing circuit for knife solenoid K-10, the knife solenoid does not operate because transfer contact K1-D is no longer connected in the circuit.

Relay K1 remains energized until the trailing edge of the original clears switch SW1 (assuming that switch SW-H has by this time opened). Contact K1-D restores to the position shown in FIG. 3, clutch K-6 releases, rollers 35, 36 stop turning, and no more copy paper is fed from roll 33. Similarly, the return of contact K1-D completes the energizing circuit for knife solenoid K-10, switch SW-L having closed as soon as cam 96 started to turn. Rotary knife 38 rotates in the counterclockwise direction and the copy sheet is cut from the copy paper roll.

Since contact K1-D completes the energizing circuit for both copy paper clutch K-6 and knife solenoid K-10, the paper roll feed stops slightly prior to the operation of the knife. This could present serious difficulty (the copy paper transport system would continue to draw paper while no more could be fed past rollers 35, 36) were the following corrective measure not taken. The forward edge of the copy paper, when it is first fed over rotary knife 38, continues to move upward until it strikes the underside of deflector 66 (FIG. 1). The paper then moves under the deflector toward rollers 39, 40, but the paper bears against the underside of deflector 66, not the upper surface of knife 38. Deflector 66 thus serves as a "loop former," establishing some slack in the copy paper between rollers 35, 36 and 39, 40. When rollers 35, 36 stop turning, rollers 39, 40, which continue to rotate, take up the slack. The knife finishes its cut before most of the slack is taken up.

With the release of relay K1 and the opening of contact K1-E, timing motor TM3 also deenergizes. Cam 96 is connected by spring 100 to stop 99. Pin 101 is included on the underside of the cam. As soon as TM3 deenergizes, the spring causes cam 96 to restore in the counterclockwise direction with the cam stopping when pin 101 hits stop 99. Camming surface 98 once again opens switch SW-L. The energizing circuit for knife solenoid K-10 is broken and knife 38 restores.

In the event the original is greater than 20 inches, camming surface 98 opens switch SW-J after 20 inches of copy paper have been fed from roll 33. The energizing circuit for relay K1 is broken, contact K1-D restores and the knife operates to cut off the maximum length of 20 inches from the copy paper roll. Cam 96 restores as though the trailing edge of the original had passed switch SW1.

As the original continues to be transported toward the scanning window the leading edge actuates switch SW2

(actually, this occurs before the trailing edge passes switch SW1 and the knife operates). The closing of the switch energizes relay K2. Contact K2-A closes to provide an alternate path for the corona charging system through this contact and contact K4-F. Originally, the corona charging current flowed through contact K1-C. Even after relay K1 releases, however, the corona charging circuit remains energized as long as relay K2 is operated. This is necessary because were the corona charging system to deenergize with the release of relay K1, the trailing portion of the cut copy sheet would not be charged.

Although contact K2-C opens with the energization of relay K2, this has no effect on the running of timing motor TM1. The motor is held operated by the current flowing through normally closed switch SW-B and now transferred switch SW-A.

As the original passes the scanning window, the copy paper is exposed. As the original continues to be scanned the leading edge actuates switch SW3. Although relay K3 energizes, it has no effect during single copy mode operation. Similarly, its release at the end of the cycle has no effect.

As cam 95 continues to rotate eventually one of the camming lobes opens switch SW-B. (As shown in FIG. 4, it is lobe 95b which opens switch SW-B, although it is understood that a different lobe controls this operation during each cycle as the cam makes only one-third of a revolution during each copying operation.) With the opening of switch SW-B timing motor TM1 stops operating. Cam 95 remains parked with switches SW-E and SW-F still closed, thus keeping the two exposure lamps on.

When the trailing edge of the original passes switch SW2, relay K2 deenergizes. With the opening of contact K2-A the corona charging circuit deenergizes. (Contact K1-C is by this time open since relay K1 releases before relay K2). Since the trailing edge of the copy paper is now clear of the corona unit further charging is unnecessary. With the release of relay K2, contact K2-C closes. Since contact K5-A is always closed during the single copy mode, and contact K1-A restored to its closed position with the release of relay K1, timing motor TM1 resumes operating even though switch SW-B is still open. Cam 95 thus resumes its rotation in the counterclockwise direction. Switches SW-E and SW-F are still closed, however, because it is necessary to keep the exposure lamps energized until after the exposure process has been completed.

As soon as cam 95 rotates slightly further in the counterclockwise direction, switch SW-B closes once again to provide an alternate current circuit for timing motor TM1. After cam 95 has rotated one-third of a revolution, with the lobes being in the positions shown in FIG. 4 (although each has moved 120°), switch SW-A reverses and assumes the position shown in FIG. 3. At this time the timing motor turns off because contacts K1-C and K2-A are open. Although cam 95 starts turning from its parked position when the trailing edge of the original passes switch SW2 at the forward end of the scanning window, by the time cam 95 has rotated from the parked position through the end of its one-third revolution the original has been completely transported past the scanning window and the copy sheet has completely passed by the copy exposure window. With cam 95 in its initial position (although rotated 120°), switches SW-E and SW-F open and the two exposure lamps turnoff.

It should be noted that timing motor TM1 stops operating and cam 95 is parked when switch SW-B is opened. The operation of the timing motor and the rotation of cam 95 resume when the trailing edge of the original passes switch SW2 and relay K2 releases. With a short original it is possible for relay K2 to release even before switch SW-B is opened. In such a case cam 95 is not parked. However, it requires 5 seconds for cam 95 to rotate 120° and the two exposure lamps thus remain on for at least 5 seconds during each copying cycle. (With an original shorter than the distance between rollers 9 and 8, the original becomes trapped between the rollers and it is necessary to lift the bridge in order to remove the document. Switch SW2 does not operate and a maximum length copy sheet is cut. Since the original does not pass the scanning window the copy sheet is not exposed and is transported out of the machine with no image on it.)

The original and the copy are deposited in their respective trays as they are passed through the machine. At the end of the process all switches and relays are in the conditions shown in FIg. 3 and 4, with the exception of cam 95 which has rotated 120°. However, since the cam has three symmetrically positioned lobes, as far as the machine operation is concerned the cam is in its initial position.

DETAILED DESCRIPTION OF MULTIPLE COPY OPERATION

The number of copies produced is selected by the operator. The outer edge of the multiple copy selector dial 107 (FIG. 5) is sequentially numbered in 16 equal graduations, starting with 1 and progressing in the counterclockwise direction up to 16. The normal or single copy mode position of the multiple copy selector dial is that in which the numerically designated position of 1 is as shown in FIG. 5. If the dial is in the normal position the machine operates in the single copy mode. To select any other number of copies, the dial is turned until the desired number is in the "12 o'clock" position. The dial can be rotated or changed at any time during the copying cycle.

During each reverse travel of the original, the dial is rotated one position in the counterclockwise direction by timing motor TM2. This "counting down" or decrementing of the selector dial provides a visual indication of the number of copies which must yet be made. If the selector is not changed by the operator, the decrementing continues until the dial is in the single copy mode position of FIG. 5. At this time, the original is scanned for the last time after which it is deposited in the original receiving tray just as it is during the single copy mode.

In the multiple copy mode, the functional sequence is the same as that of the single copy mode except that when the leading edge of the original actuates switch SW3 during the first scan cycle, a series of control circuits are activated. These control circuits reverse the normal travel of the original transport system when the trailing edge of the original clears switch SW3. The original is reversed at high speed. The control circuits also prevent the machine from making a copy while the original is being reversed.

When the leading edge of the original clears switch SW2 during high speed reverse, the transport system is again normalized so that the original is transported in the forward direction to be scanned once again. This action is repeated until the multiple copy selector dial is decremented to the 1 position at which time the last scan begins with the machine operating in the single copy mode. The multiple copy selector dial has two camming surfaces 102 and 103. Camming surface 102 has 16 detent positions equally spaced around the circumference of the cam. The actuating arm for switch SW-C rides on the camming surface. When the actuating arm is on a high portion of the camming surface (between detents) switch SW-C is closed. Each time camming surface 102 is rotated the switch actuating arm drops into a detent and switch SW-C opens. When the timing motor TM2 is first energized camming surface 102 starts to rotate in the counterclockwise direction. The actuating arm of switch SW-C moves to a high point on camming surface 102 to close the switch. The control circuit that initially starts the timing motor rotation is deenergized soon after the timing motor starts to operate, but if it is energized long enough the "lock circuit" established by the closing of switch SW-C insures the continued timing motor operation until the actuating arm drops into the next detent of camming surface 102. At this time, timing motor TM2 stops operating.

Camming surface 103 has only one detent. The detent is located at a position such that it will permit the actuating arm of switch SW-D which rides on the camming surface to be in the detent only when the multiple copy selector dial is in the single copy mode position. When actuating arm is in the detent the switch is open. It is switch SW-D which controls the multiple copy mode sequencing circuits. When the selector dial is manually rotated to a position representing the number of copies desired, both surfaces of cams 102 and 103 are rotated. With switch SW-D closed the multiple copying operation ensues. But as the selector dial is decremented, switch SW-D opens when the numeral 1 on the dial is in the "12 o'clock" position. After the original is reverse transported for the last time, the last of the required number of copies is made in the same way that a single copy is made.

Up to the point when switch SW3 is first energized by the leading edge of the original the operation in the multiple copy mode is the same as that in the single copy mode. With the energization of switch SW3 and the operation of relay K3, contact K3-D closes to energize relay K5. Current flows through contact K3-D, the relay coil, and switch SW-D, switch SW-D being closed by camming surface 103 when more than one copy is being made.

When contact K5-C closes current flows through the energizing coil of clutch timer K-9. The operation of this clutch couples cam 104 (FIG. 6) to drive chain 75 (FIG. 2). Cam 104 thus rotates in the forward (counterclockwise) direction as shown in FIG. 6. (Gearing, not shown, is provided to gear down the speed of cam 104 with respect to the drive chain speed. Cam 104 makes less than a single revolution even for the maximum length original). Switch SW-Q is normally closed. As cam 104 continues to rotate in the forward direction, switch SW-Q opens in the energizing circuit for relay K1. However, relay K1 remains energized. Although after 8 inches of copy paper have been fed into the machine switch SW-H is opened by camming surface 97 on cam 96, relay K1 remains energized by the current flowing through contact K1-B, diode CR-12, switch SW1, contact K4-D and switch SW-J.

When relay K5 first energizes, contact K5-A opens. It will be recalled that in the single copy mode timing motor TM1 first operates when relay K1 is energized and contact K1-C closes. The timing motor continues to operate until switch SW-B opens at which time the timing motor is parked. When relay K2 releases and contact K2-C closes (contact K1-A having closed earlier), the timing motor continues to operate until cam 95 has turned through its one-third revolution. However, with relay K5 operated and contact K5-A open in the multiple copy mode, the timing motor cannot resume operating when relay K2 releases and contact K2-C closes. Consequently, the timing motor remains parked throughout the multiple copy mode. Switches SW-E and SW-F remain closed and the two exposure lamps remain operated throughout the multiple copy cycle. It is only when the last copy is being made and relay K5 is released because switch SW-D is open that the last release of relay K2 allows timing motor TM1 to resume operation. Thus, even in the multiple copy mode cam 95 turns through only 120° during the entire cycle.

With the leading edge of the original at photocell 15, relays K1, K2, K3 and K5 are energized, the corona circuit is still energized through contact K1-C, and through the alternate circuit including contact K2-A and K4-F, and the copy paper roll clutch K-6 is still energized through the K1-D transfer contact. The exposure lamp timing motor TM1 becomes parked as soon as cam 95 has rotated a sufficient amount to open switch SW-B. Copy paper knife timing motor TM3 is still operating since contact K1-E is closed. Switch SW-N is open and switch SW-L is closed. Assuming that the length of the original is greater than 8 inches, switch SW-H is open. Cam 104 continues to rotate in the forward direction.

The scanning and exposure process continues until the trailing edge of the original clears switch SW1 and relay K1 deenergizes. When contact K1-D restores to the position shown in FIG. 3, copy paper roller clutch K-6 deenergizes to stop the copy paper feed. At the same time knife solenoid K-10 operates to cut the copy paper to the length of the original. Since contact K1-E is now open, timing motor TM3 stops operating and spring 100 returns cam 96 to the initial position. When switch SW-L opens, knife solenoid K-10 releases. (Again, if the length of the original is greater than 20 inches, camming surface 98 on cam 96 operates switch SW-J thereby releasing relay K1 so that knife solenoid K-10 operates to cut off a 20-inch length of copy paper.)

With short originals, relay K1 releases before relay K5 operates since the trailing edge of the original passes photocell 13 before the leading edge reaches photocell 15. The operation is the same, however, except that relay K1 does not deenergize until switch SW-H opens after a minimum length of 8 inches has been fed from the copy paper roll.

Although relay K1 is deenergized and contact K1-C is open, contacts K2-A and K4-F are still closed so that the corona charging system is still energized. Eventually the trailing edge of the original passes switch SW2 permitting relay K2 to deenergize. With the opening of contact K2-A the corona system is deenergized. Originally, relay K5 was energized by the current flowing through contact K3-D. As will be seen below, relay K3 soon releases. However, with relay K2 deenergized, contact K2-B is in the position shown in FIG. 3 and relay K5 is held energized by current flowing through contact K2-B and contact K5-B. Although contact K2-C closes with the release of relay K2 (which causes timing motor TM1 to resume operation in the single copy mode), because relay K5 is energized and contact K5-A is open, timing motor TM1 remains deenergized in the multiple copy mode.

The trailing edge of the original clears the scanning window glass at the same instant that the trailing edge of the copy paper clears the exposure window opening. The scanning and exposure process is now complete and the copy sheet is being developed. The copy sheet is then deposited in the copy receiving tray. When the trailing edge of the original clears switch SW3, relay K3 is deenergized. While relay K3 was energized, contact K3-C was in its rightmost position. Since contact K4-B was open relay K4 could not operate. However, when contact K3-C restores to its normal position relay K4 operates since at this time contact K5-D is closed. With the energization of relay K4 a number of operations take place.

In the single copy mode, forward clutch K-7 is operated by current flowing through contact K4-C to control the forward feed of the original. Similarly, in the multiple copy mode relay K4 is initially deenergized and the original is fed in the forward direction with the energization of clutch K-7. But as soon as relay K4 energizes contact K4-C moves to its rightmost position in FIG. 3 to deenergize clutch K-7 and to energize clutch K-8. At this time the original is fed in the reverse direction through the machine. As described above in connection with FIG. 2, the reverse feed is faster than the forward feed.

Originally, contacts K4-A and K3-A, and switch SW-C were open so that timing motor TM2 could not operate. As soon as the trailing edge of the original passes switch SW3, relay K3 releases and contact K3-A closes. Since relay K4 operates at the same time and contact K4-A closes, current flows through this contact and contact K3-A to timing motor TM2. The timing motor thus starts to turn the multiple copy selector dial in the counterclockwise direction. But the original immediately starts it reverse feed through the machine, relay K3 is immediately reenergized and contact K3-A opens. By this time cam 107 has not rotated sufficiently such that the actuating arm of switch SW-C is on a high portion of camming surface 102. The detents on cam 102 are sufficiently wide to prevent closing of switch SW-C during the short interval that relay K3 is released. With switch SW-C still open when relay K3 reenergizes, timing motor TM2 stops operating. The dial is not decremented at this time.

The first photocell to become deenergized during the reverse feed is photocell 15 and relay K3 thus energizes. Relay K4 was first operated when relay K3 released and contact K3–C restored to the initial position shown in FIG. 3. Although contact K3–C now moves to its rightmost position, relay K4 remains energized by the current flowing through contact K3–C and contact K4–B. In order that contact K4–B not open during the switching of contact K3–C, relay K4 is prevented from releasing by current flowing through capacitor 110, this current continuing to flow until contact K3–C restores. Relay K5 was originally operated with the energization of relay K3 and the closing of contact K3–D. Subsequently, the relay was alternately energized with the release of relay K2 and the restoring of contact K2–B to the position shown in FIG. 3. At the end of the forward feed, contact K3–D opened with the release of relay K3 but the alternate energizing path held relay K5 operated. With the closing of contact K3–D at the start of the reverse feed, relay K5 is held on by currents through both paths.

The original continues to travel in its reverse direction. With relay K1 deenergized and contact K1–D in its normal position, clutch K–6 is not operated and there is no copy paper feed. Relay K5 is still energized and contact K5–C is still closed, timer clutch K–9 is still operated and cam 104 is still coupled to drive chain 75. But since the drive chain is now moving in the reverse direction, cam 104 moves in its reverse direction (clockwise). The cam, which at the end of the forward feed is in a position such as that shown by the numeral 106 in FIG. 6 (the exact position depends on the length of the original), starts moving toward its original position adjacent stop 105.

The original continues to be reverse transported and cam 104 continues to be restored. The trailing edge of the original actuates switch SW2 which results in the energization of relay K2. Although transfer contact K2–B switches position, relay K5 is held operated through contact K3–D. Relay K4 is now held operated through its own contact K4–B, and both contacts K3–C and K2–B. The trailing edge of the original then actuates switch SW1. This has no effect on relay K1, however, since switch SW–Q is open, and because relay K4 is energized contact K4–D is open as well. (It should be noted that switch SW1 is bypassed anyway by closed contact K4–E, which condition similarly cannot control the energization of relay K1.) Eventually, cam 104 restores sufficiently to close switch SW–Q. Current flows through switch SW–N, contact K4–E and switch SW1 in parallel, switches SW–Q and SW–J, and the relay coil. With a short original the trailing edge may not control the closing of switch SW1 by the time switch SW–Q closes. Bypassing contact K4–E is provided for this purpose—relay K1 energizes with the closing of switch SW–Q even if switch SW1 has not yet closed. This is necessary because relay K1 must operate to start the forward feed when switch SW–Q closes for there to be proper registration at the start of the next forward feed.

The actual time that relay K1 energizes as a result of the closing of switch SW–Q is variable, dependent upon the length of the original. As described above, timer clutch K–9 is energized with the closing of contact K5–C. This contact closes only when relay K5 energizes as a result of the closing of contact K3–D, which contact closes with the energization of relay K3 when the leading edge of the original actuates switch SW3. At this time drive chain 75 moving in the forward direction rotates cam 104 in the forward direction. When the trailing edge of the original clears switch SW3, the rollers in the original transport system are reversed. The timer clutch K–9 is still energized and consequently cam 104 is driven in the reverse direction. Although the drive chain moves at a faster speed in the reverse direction, the important criterion is the distance it moves. This distance is represented by the distance previously moved through by cam 104.

Since cam 104 first started to move when the leading edge of the original passed switch SW3, it would appear that switch SW–Q closes and relay K1 energizes only when the leading edge of the original is reverse transported past switch SW3. However, this is not the case. The camming surface of cam 104 is curved as shown in FIG. 6. Section 104a of the camming surface actuates switch SW–Q during the reverse movement of cam 104 even before the cam is fully restored to its initial position. Consequently, relay K1 is energized and the copy feed begins even before the leading edge of the original is adjacent switch SW3. The forward feed rate of the copy paper and the reverse speed rate of the original, as well as the shape of cam 104, are such that the leading edge of the original reaches switch SW2 at the same time that the copy paper has been fed into the machine an amount such that its forward edge reaches the copy exposure window. The fact that switch SW–Q closes even before cam 104 has completely restored allows the copy paper feed to begin even before the leading edge of the original has been completely drawn back into the machine. This allows for maximum copying speed since by the time the leading edge of the original has cleared the scanning window and is adjacent switch SW2, the leading edge of the copy paper is adjacent the exposure window and the forward feed of the original can start immediately. The original need be reverse transported the minimum distance, i.e., only until its leading edge just clears the scanning window.

With the closing of switch SW–Q and the energization of relay K1, the corona circuit is once again operated through contact K1–C. Copy paper roller clutch K–6 is also energized as a result of contact K1–D moving to the right. Similarly, knife timing motor TM3 starts operating with the closing of contact K1–E. It is thus seen that with the closing of switch SW–Q, the copy feed cycle begins. While in the single copy mode the copy feed begins when the leading edge of the original actuates switch SW1, such is not the case in the multiple copy mode. In the multiple copy mode the copy feed starts when auxiliary feed switch SW–Q closes.

Eventually the trailing edge of the original actuates switch SW1 which provides an alternate current path around contact K4–E. Consequently, even after relay K4 deenergizes, relay K1 remains operated.

When the leading edge of the original clears switch SW3, relay K3 deenergizes. With the opening of contact K3–D, relay K5 deenergizes. This in turn opens contact K5–C to release timer clutch K–9. By this time cam 104 is in its initial position since the leading edge of the original is adjacent switch SW3. Although contact K3–C restores, relay K2 is still energized and relay K4 remains energized by the current through contacts K2–B and K4–B.

With relay K3 released and relays K2 and K4 operated, timing motor TM2 starts operating once again. This time, however, relay K3 does not immediately reenergize and cam 102 moves sufficiently to close contact SW–C. Contact SW–C is closed before relay K2 releases as the leading edge of the original clears switch SW2. The closed contact keeps timing motor TM2 energized until the dial is decremented one position and the contact opens.

The original continues to move in the reverse direction until the leading edge clears switch SW2. Relay K2 deenergizes and with the restoring of contact K2–B relay K4 deenergizes. When contact K4–C restores, reverse clutch K–8 is deenergized and forward clutch K–7 energizes. Thus, the leading edge of the original, which has just cleared the original scanning window and the adjacent switch SW2, starts moving in the forward direction. Since at this time the leading edge of the copy paper is adjacent the forward end of the copy exposure window, perfect registration of the original and copy sheet is assured.

At this point in the operation relays K1 and K2 are energized and relays K3, K4 and K5 are deenergized. As soon as relay K1 releases when the trailing edge of the original passes switch SW1, the copy paper roll feed stops and knife solenoid K–10 is actuated. The remainder of the cycle is the same as the first cycle. Similarly, subsequent cycles are identical to the second cycle. The multiple copy selector dial is decremented following each copy cycle. Eventually, the multiple copy selector dial is restored to the single copy position. Since switch SW–D is then open (following the completion of the next-to-last copy cycle) and relays K4 and K5 cannot operate, the last copy cycle is the same as that in the single copy mode, except for the fact that the copy paper feed has already started during the last reverse travel of the original.

It is thus seen that multiple copies can be made very fast. Not only is the original moved back through the machine at an increased speed, but the copy paper feed starts even before the original has completely cleared the scanning window. The leading edge of the original is not restored all the way to switch SW1. Instead, it is restored only to the front edge of the scanning window. By providing clutched cam 104, the leading edge of the copy paper reaches the copy exposure window just when the leading edge of the original reaches switch SW2 at which time forward feed of the original begins. The use of cam 104 allows the copy paper feed to begin even though the leading edge of the original is still out of the machine. The machine need not detect the leading edge of the original as it is withdrawn into the machine in order to start the copy paper feed because the position of cam 104 in effect represents the position of the leading edge of the original.

Although the invention has been described with reference to a particular embodiment, it is to be understood that this embodiment is merely illustrative of the application of the principles of the invention. For example, precut sheets of copy paper can be used rather than a copy paper roll. In such a case, during multiple copying a sheet of copy paper would begin to be fed during the return of the original, and there would be no need for a knife mechanism. Thus, numerous modifications may be made in the illustrative embodiment of the invention and other arrangements may be devised without departing from the spirit and scope of the invention.

We claim:

1. A copying machine comprising a scanning window, roller means for engaging and transporting an original document to be copied in the forward direction past said scanning window, an exposure window, means for transporting copy paper past said exposure window in synchronism with the forward movement of said original past said scanning window, means for scanning said original at said scanning window and in response thereto for exposing said copy paper at said exposure window, and means for controlling said roller means to return said original in the reverse direction past said scanning window to permit another forward movement of said original past said scanning window and another exposure of copy paper at said exposure window in response thereto.

2. A copying machine in accordance with claim 1 wherein said roller means returns said original past said scanning window in said reverse direction at a speed greater than the speed of said original in said forward direction.

3. A copying machine in accordance with claim 2 further including a roll of copy paper, means for initiating the feed of said copy paper from said roll toward said exposure window at the speed of said original in said forward direction responsive to the detection of the leading edge of said original, and means for cutting a copy sheet from said roll and stopping the feed from said roll responsive to the detection of the trailing edge of said original.

4. A copying machine in accordance with claim 3 further including means for automatically initiating the feed of said copy paper toward said exposure window while said original is being transported in the reverse direction past said scanning window.

5. A copying machine in accordance with claim 4 further including means adapted to be driven with said roller means responsive to the detection of the leading edge of said original and for moving in a first direction while said original continues in its forward direction and for thereafter moving in a second opposite direction while said original is moved in its reverse direction, and means responsive to the movement in said second direction of said driven means for operating said automatically initiating means.

6. A copying machine in accordance with claim 4 further including means for representing the number of copies required of said original, means for decrementing said representing means responsive to each copy made by the machine, and means for discharging said original from the machine in accordance with the number represented by said representing means after the required number of copies have been made.

7. A copying machine in accordance with claim 6 wherein said scanning means includes an exposure lamp, means for energizing said lamp before the leading edge of said original reaches the front edge of said scanning window and for maintaining said lamp energized until the trailing edge of said original has passed said scanning window, and means responsive to more than one required copy being represented by said representing means for preventing the deenergization of said exposure lamp until after said original has passed said scanning window for the last time.

8. A copying machine in accordance with claim 3 further including means for preventing the operation of said cutting means until a predetermined minimum length of copy paper has been fed from said roll, and means for controlling the operation of said cutting means after a maximum length of copy paper has been fed from said roll independent of the detection of the trailing edge of said original.

9. A copying machine in accordance with claim 3 further including deflector means for forming a slack portion in said copy paper between said paper roll feed initiating means and said exposure window, said slack being taken up during any interval between the stopping of said feed initiating means and the completion of the operation of said cutting means.

10. A copying machine in accordance with claim 5 wherein said driven means controls the operation of said automatically initiating means at a time during its movement in said second direction such that the ratio of the distance from the leading edge of said original to that point in its forward path of movement where it becomes synchronized to movement of said copy paper to the distance from said cutting means to that point in the copy paper path of movement where said copy paper becomes synchronized to forward movement of said original is equal to the ratio of the reverse speed of said original to the forward speed of said original.

11. A copying machine comprising a scanning window, means for controlling the transport of an original document to be copied in the forward direction past said scanning window, an exposure window, means for transporting copy paper past said exposure window in synchronism with the forward movement of said original past said scanning window, means for scanning said original at said scanning window and in response thereto for exposing said copy paper at said exposure window, means for controlling the transport of said original in the reverse direction past said scanning window to permit another forward movement of said original past said scanning window and another exposure of copy paper at said exposure window in response thereto, said reverse transport controlling means being operative to control movement of said original past said scanning window at a speed greater than the speed at which said original moves past said scanning window in the forward direction, and means for initiating the operation of said copy paper transporting means while said original is being transported in the reverse direction past said scanning window at a time such that when said original starts to be transported in the forward direction the leading edges of said original and said copy paper are in optical synchronization.

12. A copying machine in accordance with claim 11 further including means adapted to be driven by said forward transport controlling means in response to the detection of the leading edge of said original and for moving in a first direction while said original continues in its forward direction and for thereafter moving in a second opposite direction while said original is moved in its reverse direction, and means responsive to the movement in said second direction of said driven means for operating said initiating means.

13. A copying machine in accordance with claim 11 wherein said initiating means operates at a time during the reverse movement of said original such that the loading edge of said copy paper is in synchronization with the leading edge of said original at the same time that the leading edge of said original moving in said reverse direction reaches the front edge of said scanning window, and further including means responsive to the leading edge of said original reaching the front edge of said scanning window for deenergizing said reverse transport controlling means and for enabling the operation of said forward transport controlling means.

14. A copying machine in accordance with claim 11 wherein said scanning and exposing means includes an exposure lamp, means for energizing said lamp before the leading edge of said original reaches the front edge of said scanning window and for maintaining said lamp energized until the trailing edge of said original has passed said scanning window, and means responsive to more than one copy of said original being made by the machine for preventing the deenergization of said exposure lamp until after said original has passed said scanning window in the forward direction a number of times equal to the number of times equal to the number of copies being made.

15. A copying machine in accordance with claim 11 further including a copy paper roll, means for feeding paper from said copy paper roll to said copy paper transporting means, means for cutting a sheet from said copy paper roll and for stopping the feed of copy paper from said roll responsive to the length of copy paper fed from said roll being equal to the length of said original, means for preventing the operation of said cutting and stopping means until a predetermine minimum length of copy paper has been fed from said roll, and means for controlling the operation of said cutting and stopping means after a maximum length of copy paper has been fed from said roll independent of the length of said original.

16. A copying machine comprising a scanning window, means for controlling the transport of an original document to be copied in the forward direction past said scanning window, means for making a copy of said original responsive to each forward pass of said original past said scanning window, means for controlling the transport of said original in the reverse direction past said scanning window in preparation for the making of another copy, means for deenergizing said forward transport controlling means and for energizing said reverse transport controlling means responsive to the trailing edge of said original just clearing the rear edge of said scanning window, and means for deenergizing said reverse transport controlling means and for energizing said forward transport controlling means responsive to the leading edge of said original just clearing the front edge of said scanning window.

17. A copying machine in accordance with claim 16 wherein said reverse transport controlling means controls the movement of said original at a speed greater than the speed of said original controlled by said forward transport controlling means.

18. A copying machine in accordance with claim 17 wherein said copy making means includes a supply of copy paper and means for initiating movement of a sheet of said copy paper during reverse movement of said original such that when said original starts moving in the forward direction said original and said copy sheet are in copy making synchronism.

19. A copying machine in accordance with claim 18 wherein said copy making means includes an exposure window past which said copy sheet is moved, and said copy sheet movement initiating means operates at a time during the reverse movement of said original when the distance between the leading edge of said original and that point in its forward path of movement where it becomes synchronized to movement of said copy sheet divided by said reverse speed is equal to the distance between the leading edge of said copy sheet and that point in the copy sheet path of movement where said copy sheet becomes synchronized to forward movement of said original divided by the speed of movement of said copy sheet.

20. A copying machine comprising a scanning window, means for controlling the transport of an original document to be copied in the forward direction past said scanning window, means for controlling the transport of said original in the reverse direction past said scanning window, an exposure window, means for transporting copy paper past said exposure window, first means responsive to said original being first inserted in the machine for initiating the transport of copy paper by said copy paper transporting means at a time such that the leading edge of said original within said scanning window is in synchronization with the leading edge of said copy paper within said exposure window, means responsive to the trailing edge of said original clearing said scanning window for deenergizing said forward transport controlling means and for energizing said reverse transport controlling means, second means for initiating the transport of copy paper by said copy paper transporting means during reverse movement of said original past said scanning window prior to the clearing of said scanning window by said original, and means for deenergizing said reverse transport controlling means and energizing said forward transport controlling means at a time when forward movement of said original will cause it to be in synchronization with movement of said copy paper.

21. A copying machine in accordance with claim 20 wherein said second means operates at a time during reverse movement of said original when the leading edge of said original has not yet reached the rear edge of said scanning window.

22. A copying machine in accordance with claim 21 wherein said reverse transport controlling means controls movement of said original past said scanning window at a speed greater than the speed of said original controlled by said forward transport controlling means.

23. A copying machine in accordance with claim 20 wherein said means for deenergizing said reverse transport controlling means and for energizing said forward transport controlling means operates responsive to the leading edge of said original having just cleared the forward edge of said scanning window in the reverse direction.

24. A copying machine in accordance with claim 21 wherein said means for deenergizing said reverse transport controlling means and for energizing said forward transport controlling means operates responsive to the leading edge of said original having just cleared the forward edge of said scanning window in the reverse direction.

25. A copying machine in accordance with claim 20 wherein said reverse transport controlling means controls movement of said original past said scanning window at a speed greater than the speed of said original controlled by said forward transport controlling means.

26. A copying machine in accordance with claim 25 wherein said means for deenergizing said reverse transport controlling means and for energizing said forward transport controlling means operates responsive to the leading edge of said original having just cleared the forward edge of said scanning window in the reverse direction.

27. A copying machine in accordance with claim 20 further including a roll of copy paper, said first and second initiating means controlling the feed of copy paper from said roll to said copy paper transporting means, said first means being operative to initiate the feeding of copy paper from said copy paper roll responsive to the detection of the leading edge of said original, and means responsive to the detection by said first means of the trailing edge of said original for cutting the copy paper fed from said roll and for stopping further feed of copy paper from said roll.

28. A copying machine in accordance with claim 27 wherein said second means includes means adapted to be driven in synchronism with said forward and reverse transport controlling means, means responsive to the detection of the leading edge of said original for controlling the forward driving of said driven means in synchronism with said forward transport controlling means, said driven means thereafter being driven in its reverse direction in synchronism with said reverse transport controlling means responsive to the energization of said reverse transport controlling means and the deenergization of said forward transport controlling means, and means responsive to the return of said driven means to predetermined point in its path of reverse movement for initiating the feed of copy paper from said copy paper roll.

29. A copy machine in accordance with claim 28 wherein said predetermined point in the path of reverse movement of said driven means is such that when said point is reached the leading edge of said original has not yet reached the rear edge of said scanning window.

30. A copying machine in accordance with claim 28 wherein said reverse transport controlling means controls reverse movement of said original at a speed greater than the forward speed of said original controlled by said forward transport controlling means, said copy paper transporting means transports said copy paper at a speed equal to the forward speed of said original, and said predetermined point in the path of reverse movement of said driven means is such that between the time that said point is reached and the time that said reverse transport controlling means is deenergized said original moves an amount in the reverse direction such that its subsequent forward movement is in synchronization with movement of said copy paper.

31. A copying machine in accordance with claim 30 further including means for representing the number of copies required of said original, and means for discharging said original from the machine in accordance with the number represented by said representing means after the required number of copies have been made.

32. A copying machine in accordance with claim 27 further including means for preventing the stopping of said paper feed from said roll and the operation of said cutting means until a predetermined minimum length of copy paper has been fed from said roll, and means for controlling the stopping of said paper feed from said roll and the operation of said cutting means after a maximum length of copy paper has been fed from said roll independent of the detection of the trailing edge of said original by said first means.

33. A copying machine in accordance with claim 27 further including means for forming a slack portion in said copy paper between said cutting means and said exposure window, said slack being taken up during any interval between the stopping of the feed of said copy paper roll and the completion of the operation of said cutting means.

34. A copying machine in accordance with claim 27 further including means for representing the number of copies required of said original, and means for discharging said original from the machine in accordance with the number represented by said representing means after the required number of copies have been made.

35. A copying machine in accordance with claim 34 further including a lamp for reflecting light from said original as it passes said scanning window toward said copy paper as it passes said exposure window, means for energizing said lamp before the leading edge of said original reaches the front edge of said scanning window, and means responsive only to said original having passed said scanning window in the forward direction a number of times equal to the number represented by said representing means for deenergizing said lamp.

36. A copying machine comprising a scanning window, means for controlling the transport of an original document to be copied in the forward direction past said scanning window, means for controlling the transport of said original in the reverse direction past said scanning window, an exposure window, means for transporting copy paper past said exposure window, first means in the forward path of movement of said original document for sensing said original document when it is first is inserted in the machine to initiate the transport of copy paper by said copy paper transporting means at a time such that the leading edge of said original within said scanning window is in synchronization with the leading edge of said copy paper within said exposure window, means for scanning said original within said scanning window and exposing said copy paper within said exposure window, means operative after the scanning of said original and exposure of said copy paper are completed for deenergizing said forward transport controlling means and for energizing said reverse transport controlling means, second means for initiating the transport of copy paper by said copy paper transporting means during reverse movement of said original past said scanning window prior to the completion thereof, and means for deenergizing said reverse transport controlling means and energizing said forward transport controlling means at a time when forward movement of said original will cause it to be in synchronization with movement of said copy paper.

37. A copying machine in accordance with claim 36 wherein said means for deenergizing said reverse transport controlling means and energizing said forward transport controlling means operates prior to return of the original to that position at which said first means is operative when said original is first inserted in the machine.

38. A copying machine in accordance with claim 36 further including a roll of copy paper, said copy paper transporting means including means for feeding copy paper from said roll and means for moving copy paper fed from said roll to said exposure window, means responsive to the operation of said first means for operating said copy paper feeding means, means disposed between said feeding means and said moving means for cutting a copy sheet from copy paper fed from said roll, means for inhibiting the operation of said feeding means and controlling the operation of said cutting means such that the length of the cut copy sheet is equal to that of the original, and deflector means for forming a slack portion in said copy paper between said cutting means and said exposure window, the total slack portion formed being at least as great as the slack taken up during any interval between the stopping of said feeding means and the completion of the operation of said cutting means to permit continued normal operation of said moving means while said copy paper is being cut.

39. A copying machine in accordance with claim 38 wherein said feeding means is a pair of rollers and said moving means includes a pair of rollers disposed between said exposure window and said deflector means.